United States Patent [19]

Pienkowski et al.

[11] Patent Number: 5,814,266
[45] Date of Patent: Sep. 29, 1998

[54] METHOD FOR IMPROVING CONSOLIDATION OF POWDER RESIN

[75] Inventors: David A. Pienkowski; Eric A. Grulke; Robert J. Jacob, all of Lexington, Ky.

[73] Assignee: University of Kentucky Research Foundation, Lexington, Ky.

[21] Appl. No.: 650,605

[22] Filed: May 20, 1996

[51] Int. Cl.$^6$ ........................................................ B29B 9/10
[52] U.S. Cl. ........................ 264/443; 264/442; 264/489; 264/492; 264/331.11; 264/331.17; 264/345; 528/502 R; 528/502 C; 528/503
[58] Field of Search ................................ 528/502 C, 503, 528/502 R; 264/437, 442, 443, 331.17, 474, 476, 331.11, 345, 489, 492

[56] References Cited

U.S. PATENT DOCUMENTS

| | | | |
|---|---|---|---|
| 3,846,522 | 11/1974 | Goldman | 264/25 |
| 3,975,481 | 8/1976 | Baumgaertner | 264/126 |
| 4,014,965 | 3/1977 | Stube et al. | 264/23 |
| 4,436,682 | 3/1984 | Knopp | 264/70 |
| 5,017,311 | 5/1991 | Furusawa et al. | 264/23 |
| 5,026,511 | 6/1991 | Sano et al. | 264/28 |
| 5,096,654 | 3/1992 | Craggs et al. | 264/570 |
| 5,494,629 | 2/1996 | Gorden et al. | 264/126 |

*Primary Examiner*—Fred Teskin
*Attorney, Agent, or Firm*—King and Schickli

[57] ABSTRACT

A method for improving consolidation of powder resin is provided. The method broadly includes the steps of: (1) sorting particles of the powder resin according to their diameter; (2) combining the sorted particles having a first diameter D1 with the sorted particles having a second diameter D2 so as to form a particle mixture; (3) applying a vibration to the particle mixture; (4) heating the particle mixture; and (5) delivering the particle mixture through a nozzle or into a mold. The particle diameters D1 and D2 are chosen so that once combined there is optimal close packing of the three-dimensional spaces between the powder resin particles.

18 Claims, No Drawings

METHOD FOR IMPROVING CONSOLIDATION OF POWDER RESIN

TECHNICAL FIELD

The present invention relates generally to a process or method for producing consolidated products from polymer powder resins, and more particularly, to an improved method for enhancing the consolidation of powder resin particles such as ultrahigh-molecular-weight polyethylene polymer particles.

BACKGROUND OF THE INVENTION

In recent years, consolidation of powdered materials has become increasingly important as a fundamental technology for the development of many common and useful materials. For example, powdered metals can be consolidated to high density materials from which a wide variety of industrial and consumer products can be produced. Of course, the increasing importance of powdered materials has largely resulted from efforts to improve the quality of the end product. With each new use or potential application new quality concerns surface and must be addressed. Accordingly, it should be appreciated that a continuous need exists for improved methods or processes for consolidating powdered materials into finished products, especially the consolidation of polymeric powder resins.

Various efforts have been made in the past to improve the consolidation of powdered materials. These have often focused upon the concept of forcing the powdered particles through a nozzle at an elevated pressure and temperature in order to increase the compaction. As an example of these processes being applied to polymeric materials, U.S. Pat. No. 5,494,629 to Görden et al. discloses an injection molding process for forming an ultrahigh-molecular-weight polyethylene wherein the injection takes place at a temperature of between 160°–260° C. and an injection pressure between 80–150 megapascals. Other approaches revolving around this central concept are disclosed in U.S. Pat. Nos. 5,026,511 to Sano et al. and U.S. Pat. No. 5,096,654 to Craggs et al.

Another prior art concept relates to the application of vibration in order to increase the compaction of powder resin particles. As an example, U.S. Pat. No. 4,014,965 to Stube et al. discloses a process wherein vibratory compaction is used when forming articles from a thermoplastic resin polymer powder. Specifically, the vibratory compaction is applied to the powder material at frequencies within the range of about 1–25,000 cycles per second, with the vibration causing increased compaction between the material particles. Another, similar approach is disclosed in U.S. Pat. No. 5,017,311 to Furusawa et al.

Additionally, other efforts for improving the consolidation of powder resin particles have been directed towards applying radiant energy to the particles. For example, U.S. Pat. No. 3,846,522 to Goldman discloses such a process for forming a shaped plastic article wherein microwave energy is used to heat the thermoplastic resin particles. Thus, the heating of the resin allows for the amount of compaction to be controlled.

Despite these prior art efforts to increase consolidation, certain applications of powder resin materials require that still better consolidation be obtained in order to provide the final molded product with desirable physical properties for reliable long term operation in the anticipated working environment.

For example, ultrahigh-molecular-weight polyethylene powder resin is used in constructing bearing surfaces of prosthetic total hip, knee and shoulder joint replacements, such as described in Applicant's co-pending U.S. patent application Ser. No. 08/623,605, filed Mar. 28, 1996, now U.S. Pat. No. 5,702,456, and entitled "Method for Reducing the Generation of Wear Particulates from An Implant". Currently used methods of consolidating ultrahigh-molecular-weight polyethylene powder resin particles are believed to be incapable of producing a material with sufficient consolidation to withstand long term use as an implant without producing excessive wear particulates and submicron-sized debris. These particulates and debris become entrapped in the tissue surrounding the implant and effect an immune response. Over time, such an immune response may result in joint implant failure.

Thus, it is clear that a need exists for enhancing the integrity of consolidation of powder resin particles so that products molded therefrom perform better in their intended operating environments. Additionally, by further increasing the integrity of consolidation, it should be possible to identify additional applications and beneficial uses for materials formed from the highly consolidated powder resin.

SUMMARY OF THE INVENTION

Accordingly, it is a primary object of the present invention to provide a method for improving consolidation of powder resin overcoming the above-described limitations and disadvantages of the prior art.

Another object of the present invention is to provide a method for improving consolidation of powder resin which increases the performance, as well as potential uses and applications, of materials formed therefrom.

Yet another object of the present invention is to provide a method for improving consolidation of powder resin wherein particles of predetermined differing sizes are used so as to provide optimum packing of the three-dimensional spaces between the resin powder particles.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a method for improving the consolidation of powder resin particles is provided. The method includes the initial step of sorting virgin powder resin particles according to their diameter. The method next includes combining the sorted particles having a first diameter D1 with the sorted particles having a second diameter D2 so as to form a particle mixture. It should be recognized that the particles having diameter D1 are larger than the particles having diameter D2. Furthermore, the ratio of D2/D1 is preferably less than 0.225, but more than 0.155. For example, a distribution of powder particles, like those of table 1, would have a D1 of 70–90 and more preferably 80 microns and the D2 particles would range in diameter from 10.4 to 20 and more preferably from 12.4 to 18 microns. Accordingly, it should be appreciated that by combining particles having a larger diameter D1 with particles having a smaller diameter D2, increased consolidation between the powder resin particles is achieved. More specifically, the particles with diameters D1 and D2 provide optimal close packing of the three-dimensional spaces between the powder resin particles. Thus, the particles are packed as closely together as possible, decreasing the air filled space and, accordingly, enhancing the integrity of the consolidation process and thereby reducing any tendency of the particles to become separated during use of the resulting consolidated material.

The method also includes the step of vibrating the particle mixture. The method further includes the steps of heating the particle mixture, as well as, delivering the particle mixture under pressure through a nozzle. The vibrating, heating and delivery through the nozzle cooperatively aid in further improving the consolidation between the powder resin particles.

Preferably, the vibrating is applied to the particle mixture prior to and/or simultaneously with delivering the particle mixture through the nozzle. Vibrating the particles at an ultrasonic frequency is particularly effective although, of course, other frequencies of vibration could be applied. With respect to the heating of the particle mixture, the heat is preferably supplied by either infrared or microwave electromagnetic radiation and may be applied prior to and/or simultaneously with delivering the particle mixture through the nozzle. Of course, the vibration frequency and applied heat energy may be varied as necessary depending upon the type of powder resin and size of resin particles being processed. The goal is to bring the powder resin to just above its melting point as it is pressed and extruded through the nozzle or even formed in a mold.

As should be appreciated, the particle mixture is delivered through the nozzle at an elevated pressure sufficient to achieve a compaction ratio of approximately 6:1 between the particles. Preferably, the pressure in the nozzle is typically 34.0 MPa or greater. Furthermore, the delivery through the nozzle at an elevated pressure also causes the temperature of the particle mixture to be increased. Preferably, the resin temperature reaches a level above the melting point of the particles to increase the fusion between the closely compacted particles. Advantageously, by rapidly forcing the particles at an elevated pressure and temperature through the nozzle, a still further increased consolidation is achieved between the particles.

In accordance with yet another aspect of the present invention, sorted particles having a third diameter D3 may be combined with the sorted particles having diameters D1 and D2 to form the particle mixture. Preferably, the particles having diameter D1 and D2 are larger than the particles having diameter D3. The size of the D3 particles is selected so that the D3 particles fill the space between the D1 and D2 particles in the particle mixture increasing particle density and further reducing air space/volume prior to compaction.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

DETAILED DESCRIPTION OF THE INVENTION

A detailed description is now provided for the present invention, and more specifically for the method for improving consolidation of polymeric powder resins. As will become apparent from the disclosure set forth herein, the ability to closely compact polymeric powder resin particles is important when developing materials made therefrom. The use and application of such materials often require a high degree of consolidation between the powder resin particles. For example, ultrahigh-molecular-weight polyethylene (UHMWPE), a material created from a powder resin, is used in constructing prosthetic total joint implants. UHMWPE particles have been repeatedly found in the tissues surrounding aseptically loosened implants. This is a direct result of state of the art methods of consolidating UHMWPE powder resin not producing a sufficiently or completely consolidated material capable of avoiding this problem.

The present method for improving consolidation of powder resin first includes the step of sorting particles of the powder resin according to the diameter of the particles. Next, the method includes the step of combining the sorted particles having a first diameter D1 with the sorted particles having a second diameter D2 so as to form a particle mixture. Preferably, the D2 particles are significantly smaller than the D1 particles. In addition, the diameter ratio of the D2 particles to the D1 particles is preferably less than 0.225 but greater than 0.155.

Advantageously, the sizes of the particles having diameters D1 and D2 are chosen so as to provide optimal close packing of the three-dimensional spaces between the powder particles. Preferably, the diameter of particles D1 is in the range of 80 microns ±10 microns and the diameter of particles D2 is in the range of 12.4–18 microns ±2 microns. More particularly, the sizes of the particles D1 and D2 are determined by two factors: first, it is desirable to maximize the number of usable particles obtained in each lot of powder resin, and second, it is desirable to choose particles having diameters D1 and D2, given the distribution of powder resin particle sizes in a particular lot, so that if the D1 sized particles are packed as close together as possible then the D2 sized particles will be in the range of 0.155 to 0.225 times D1 and this means that the D2 sized particles will snugly fit in between the D1 sized particles. In this way, the precompaction/preconsolidation density of the particle mixture is increased and this leads directly to more complete consolidation of the particles following processing.

In attempting to maximize the number of usable particles obtained in a particular powder resin lot, it is important to recognize that particle size distributions may vary from one lot to another even though the same manufacturer may make the particles under the same or similar conditions. Accordingly, in carrying out the first step of sorting, it is important to first characterize the distribution of particle sizes in each lot. In accordance with the method of the present invention, the particle size characterization may be performed by using low voltage scanning electron microscopy (LVSEM) combined with particle image analysis. However, it should be appreciated that other methods of determining particle size may be employed in conjunction with the present method.

The following example sets forth the LVSEM and particle image analysis procedure for a particular lot of powder resin, and is provided for illustrative purposes only and the invention is not to be considered as limited thereto.

EXAMPLE 1

A lot of virgin GUR 4150 HP polyethylene powder, such as available from Hoechst-Celanese of Houston, Tex., was obtained for characterizing the distribution of particle sizes within the lot. Three samples were taken from the lot. Each sample was obtained by using a metal scoop to gather approximately 1 gram of material from a 0.5 kg bag of virgin powder. Precautionary steps were taken to insure that no static charges were present on the metal scoop since a charged metal scoop would be likely to retain smaller size powder particles. Next the powder was sprinkled onto double stick tape adhering to phosphor-bronze specimen holders. The polyethylene particles attached to the specimen holders were then coated with a thin (5.5 nm) discontinuous layer of platinum in an argon atmosphere by using a microsputterer coater. The particles were then examined using an Hitachi-S-900 low voltage, (1.5 kV), scanning electron microscope. These polyethylene particles, hereinafter referred to as the micron-sized particles, were imaged at a magnification of 100×, and the submicron-sized structures within these particles were imaged at a magnification of 5000×. These particular magnifications were selected to provide equivalent sizes of the micron and submicron-sized particles when observed on the LVSEM viewing screen. Two photographs were then taken at each magnification on randomly selected regions of each field of view with Polaroid type 52 film.

Next, each photomicrograph was scanned into a DEC VAX computer. An x-y grid of six vertical and six horizontal lines, all equally spaced, was superimposed on each photomicrograph of micron or submicron-sized particles. Individual "cells" in this grid were randomly selected, using a table of random numbers, and all particles inside the cell were selected for analysis. Beginning with the first randomly chosen cell, 50 particles were selected from each photomicrograph for size and shape analyses.

Then, each particle selected for analysis, whether micron or submicron-sized, was scanned into the computer and outlined with a cursor. This outline was converted to a set of x-y coordinates defining the perimeter of the particle. A custom image analysis program, available from Zedec Technologies, Burlington, N.C., was used to compute the distance from each coordinate on the perimeter to all other points on the perimeter. Particle size was then quantified by using the following measures: $D_{max}$ (maximum diameter); $D_{min}$ (least distance between all pairs of points that meet the criterion of being one-half of the perimeter away from each other); Area; and Perimeter.

Particle shape was then determined by using the circular shape factor (CSF) where $CSF = 4\eta$ Area÷Perimeter$^2$, and the aspect ratio (AR) where $AR = D_{max} \div D_{min}$. These measurements and computations were performed with a DEC Alpha 3000 workstation. No attempt was made to determine the shape and size of the nanometer sized fibrils that link the submicron-sized structures.

Each group of data regarding particle size and shape was tested for normality by using the Kolmogorov-Smirnov Test. Multiple group comparisons of normally distributed data were performed by using ANOVA and the Scheffe post hoc criteria. Non-normally distributed data was compared by using the Kruskal-Wallis test. All statistical computations were performed by using Statview 4.1 software, available from Abacus Concepts, Inc., San Francisco, Calif.

Tables 1 and 2 set forth below, show the size (in units of microns) and shape (dimensionless) parameters of micron-sized particles (Table 1) and size and shape parameters of submicron-sized particles (Table 2) for the virgin GUR 4150 HP powder used in this Example:

TABLE 1

| Lot A | Size Parameters | | | | Shape Parameters | |
|---|---|---|---|---|---|---|
| | $D_{max}$ | $D_{min}$ | Area | Perimeter | CSF | AR |
| Average | 81.4 ± 43.2 | 55.2 ± 32.1 | 4731 ± 6122 | 244.9 ± 134.6 | 0.78 ± 0.06 | 1.53 ± 0.03 |
| Range | 10.5 – 342.9 | 8.1 – 288.6 | 77 – 76817 | 32.3 – 1162.5 | 0.56 – 0.92 | 1.15 – 3.61 |

TABLE 2

| Lot A | Size Parameters | | | | Shape Parameters | |
|---|---|---|---|---|---|---|
| | $D_{max}$ | $D_{min}$ | Area | Perimeter | CSF | AR |
| Average | 0.86 ± 0.38 | 0.58 ± 0.22 | 0.48 ± 0.44 | 2.55 ± 1.08 | 0.82 ± 0.06 | 1.48 ± 0.33 |
| Range | 0.21 – 2.72 | 0.15 – 2.06 | 0.029 – 4.3 | 0.62 – 8.31 | 0.54 – 0.92 | 1.11 – 3.52 |

Advantageously, after determining the distribution of particle sizes for a particular lot, then the diameters D1 and D2 may be selected. More specifically, based upon the distribution of particle sizes, D1 and D2 will be chosen so as to maximize the number of particles having the chosen diameters. Of course, the particle sizes chosen will be within the parameters for the diameter ratio set forth above. In addition, it should be appreciated that the particles selected as having diameters D1 and D2 will not all have the same exact diameter. The actual diameters may vary by ±10 microns for D1 particles and ±2 microns for D2 particles. Thus, this allows for the maximum number of particles in a particular lot to be utilized in carrying out the method of the present invention.

The choice of particle sizes D1, D2, etc. may be adjusted, depending upon the size distributions measured, according to the methods just described. These size selections D1, D2, etc may vary by lot, resin type, or resin manufacturer.

The particles having diameters D1 and D2 must then be sorted from the remaining particles. The sorting may be done by any method known in the relevant art, such as, for example, differential centrifugation or by using a proper size sieve for separating the particles of the selected diameters. Once the particles of different diameters are sorted, they are then combined and mixed to form the particle mixture. As a result of the sorting, a particle mixture is formed having enhanced consolidation due to the closely interconnected and compacted powder resin particles.

The method also includes the steps of vibrating, heating and delivering the particle mixture through a nozzle so as to further enhance the consolidation between the powder resin particles. More specifically, the particle mixture is rapidly forced through a nozzle at elevated pressure. The rapid, high pressure compaction process causes the particle mixture to be heated above its melting point. Advantageously, the forced compaction and heating, in conjunction with the novel particle mixture (already having enhanced consolidation as a result of the sorted particles with diameters D1 and D2 being combined), causes the powder particles to fuse more completely than other current methods of extrusion or molding consolidation known in the art. The pressure at which the particle mixture is forced through the nozzle is preferably at least 34 MPa so as to achieve a compaction ratio of approximately 6:1.

The vibrating may be applied to the particle mixture either prior to and/or during delivery of the particle mixture through the nozzle. The vibration may be applied ultrasonically using an ultrasonic vibrator of a type well known in the art or by vibration welding at a lower frequency. The frequency of the vibration to be applied is determined by considering a number of factors including the geometry of the nozzle or mold, the resin type and the particle size distribution of the resin. The goal is to generate enough heat by friction to promote particle melting. Thus, vibratory compaction causes the consolidation of the particles to be even further improved.

In addition to the heating which occurs during delivery of the particle mixture through the nozzle, additional heat may be applied to the particle mixture. Additional heating is preferably applied in the form of infrared and/or microwave electromagnetic radiation. The radiation used is largely determined by the chemical properties of the resin being processed. Of course, the electromagnetic radiation heating further insures complete melting and pressure induced fusion consolidation.

In order to still further improve the consolidation between the powder resin particles, the present method may include the step of sorting the particles to obtain particles having diameters, D1, D2, D3, D4, . . . DN. Each subsequent particle diameter would be smaller than the preceding particle diameter. Advantageously, the particles of diameter D3 would fill in the voids left between particles having diameter D1 and D2. This process, could be reiterated for particles of size D4 and D5 . . . DN which fill in the voids between particles D1, D2, D3; D1, D2, D3, D4 . . . etc.

Briefly summarizing, the present method for improving consolidation of powder resin includes the step of sorting particles of powder resin according to the diameter of the particles. Particles having diameter D1 and D2 are then combined to form a particle mixture. Particles D1 are larger than particles D2 and additional particles of D3, D4, . . . DN, may also be added when forming the particle mixture. As also described, the method includes the step of vibrating, heating and delivering the particle mixture through a nozzle or into a mold so as to further enhance the consolidation of particles within the particle mixture.

In summary, numerous benefits have been described which result from employing the concepts of the present invention. Advantageously, the method of the present invention provides for improving the consolidation of powder resin particles. More specifically, the sorting, vibrating, heating and delivering steps of the method function collectively and synergistically to improve the consolidation of the powder resin particles.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method for improving consolidation of powder resin, said method comprising the steps of:
    sorting particles of said powder resin according to diameter of said particles;
    combining said sorted particles having a first diameter $D_1$, with said sorted particles having a second diameter $D_2$ to form a particle mixture wherein $D_1 > D_2$;
    vibrating said particle mixture;
    heating said particle mixture; and
    delivering said particle mixture through a nozzle.

2. The method set forth in claim 1, wherein said first diameter particles $D_1$ have a diameter within a range of 70–90 microns and said second diameter particles $D_2$ have a diameter within a range of 10.4–20 microns.

3. The method set forth in claim 2, wherein the ratio of said second diameter particles $D_2$ to said first diameter particles $D_1$ is less than 0.225.

4. The method set forth in claim 1, further including combining said sorted particles having a third diameter $D_3$ with said first diameter particles $D_1$ and said second diameter particles $D_2$ to form said particle mixture wherein $D_3 < D_2 < D_1$.

5. The method set forth in claim 1, wherein said vibrating is applied prior to delivering said particle mixture through said nozzle.

6. The method set forth in claim 5, wherein said vibrating is applied at an ultrasonic frequency.

7. The method set forth in claim 1, wherein said vibrating is applied simultaneously with delivering said particle mixture through said nozzle.

8. The method set forth in claim 7, wherein said vibrating is applied at an ultrasonic frequency.

9. The method set forth in claim 1, wherein said vibrating is applied prior to and simultaneously with delivering said particle mixture through said nozzle.

10. The method set forth in claim 9, wherein said vibrating is applied at an ultrasonic frequency.

11. The method set forth in claim 1, wherein said heating is applied simultaneously with delivering said particle mixture through said nozzle.

12. The method set forth in claim 11, wherein said heating is applied as infrared/microwave electromagnetic radiation.

13. The method set forth in claim 1, wherein said particle mixture is delivered through said nozzle at a pressure sufficient to achieve particle heating beyond melting point and a compaction ratio of 6:1 between said particles.

14. The method set forth in claim 13, wherein said pressure is at least 34 MPa.

15. A method for improving consolidation of powder resin, said method comprising the steps of:

sorting particles of said powder resin according to diameter of said particles;

combining said sorted particles having a first diameter $D_1$ with said sorted particles having a second diameter $D_2$ to form a particle mixture wherein $D_1 > D_2$; and applying pressure to and heating said particle mixture sufficiently to achieve particle heating beyond the melting point of said powder resin.

16. The method set forth in claim 15, wherein said first diameter particles $D_1$ have a diameter within a range of 70–90 microns and said second diameter particles $D_2$ have a diameter within a range of 10.4–20 microns.

17. The method set forth in claim 16, wherein the ratio of said second diameter particles $D_2$ to said first diameter particles $D_1$ is preferably less than 0.225.

18. The method set forth in claim 17, further including combining said sorted particles having a third diameter $D_3$ with said first diameter particles $D_1$ and said second diameter particles $D_2$ to form said particle mixture, wherein $D_3 < D_2 < D_1$.

* * * * *